Patented Mar. 9, 1943

2,313,425

UNITED STATES PATENT OFFICE 2,313,425

GLASS CLEANING COMPOSITION

Marcellus T. Flaxman, Inglewood, Calif., assignor to Union Oil Company of California, Los Angeles, Calif., a corporation of California No Drawing. Application February 23, 1940, Serial No. 320,465

5 Claims. (Cl. 252—139)

This invention relates to solutions for cleaning glass and has been particularly developed for the cleaning of automobile windshields and also is useful for windows and the like which are exposed to the elements.

One object of the invention is to furnish a glass cleaner solution which may be readily applied as by spraying, will wet the glass surface and spread readily and may be easily wiped dry. An important object of the invention, however, is to leave the glass surface of a windshield in such condition that, when the windshield wiper is passed across the glass surface as in the case of removing either fog or rain, an even, transparent water film will remain so that vision through the windshield will not be obscured or obstructed. Heretofore, in the use of many glass cleaning compositions, a sort of film or haze (either continuous or spotty) which has often developed on the glass surface during travel or from rain spots or streaks, has not been removed by the glass cleaner. As a result, when rain or fog accumulated while traveling which necessitated the use of the windshield wiper, the glass surface was left in a clouded, smeared, spotted, or streaked condition which in many instances so obscured vision as to make driving unsafe. This has existed entirely apart from the presence of dust which could initially cause a muddy film. On the other hand, when the glass surface is thoroughly and completely cleaned, the passage of the wiper across the glass surface when wet either by rain or fog, results in a smooth, even, water film which does not materially interfere with the view through the windshield.

The composition of the present invention results in such a thorough cleaning of the windshield surface that the operation of the windshield wiper across the glass when wet leaves a clear, even, transparent surface, and overcomes all of the objections above indicated which apparently are due to the formation of a film or haze not necessarily or at least not greatly noticeable in dry weather. My composition overcomes the development of hazy, streaky, or cloudy effects which have commonly occurred heretofore, and possesses the characteristics of not developing hazing following cleaning of the windshield and of not leaving haze-forming or other residual materials on the glass after the windshield is cleaned and wiped dry.

The present invention resides in a solution comprising water, preferably distilled water, and normal or isopropyl alcohol, preferably the latter, together with a small percentage of the water-soluble basic salt tetrasodium pyrophosphate ($Na_4P_2O_7$) which dissolves in the solution and will act to remove whatever haze or film has been formed on a windshield which causes the objectionable smearing or clouding of the glass surface, or at least insures a clear, even water film on the windshield as the windshield wiper passes over the surface when it is wet with rain or fog. Commonly, the solution contains about 20% to 30% of isopropyl alcohol which does not attack paints and lacquers and imparts good wetting, spreading, and drying properties not possessed by any other alcohol which does not attack lacquers readily. The solution may, however, contain somewhat smaller or even greater quantities up to 40% or 50% of this alcohol, depending upon the extent of quick drying properties required in the cleaner. The tetrasodium pyrophosphate is used in proportions of around 0.05% to 0.1% to give a pH value of about 10. The percentage is not increased much beyond about 0.15% because of the tendency of increased amounts of tetrasodium pyrophosphate (especially above 0.2%) to cause a prompt re-forming of haze or film after the cleaning of the windshield and especially after the windshield has been wet as with rain or fog and then allowed to dry. The same is true of the corresponding potassium salt, and when the sodium salt is referred to herein, it is meant also to include the potassium salt.

These salts are the only salts applicant has found which will produce all the results required in windshield cleaning as previously indicated. They are definitely the only phosphates having such functions. Trisodium phosphate, for example, is not suitable because it is of such a character that it causes almost immediate reforming of objectionable haze or film. Sodium metaphosphate possesses a pH of 7 to 8 which is too low for adequate and sufficiently quick removal of haze and film developed on windshields during use. Sodium tetraphosphate which has a pH of 9 is too slow, and possesses the important objection that it is not stable, with the result that the pH value drops off too quickly in storage. This leaves the tetrapotassium and tetrasodium pyrophosphates as the only salts useful for the stated purposes.

In addition to the object sought as above indicated of insuring an even, transparent water film as the windshield wiper operates in a thick fog or light or heavy rain, it has been observed that windshields which have been freshly cleaned by the present compositions ordinarily do not require the operation of a windshield wiper at all where driving in moderate rain. This, however, does not apply to a mere drizzle or fog which fails to supply sufficient water to maintain an even film. The reason for this phenomenon is presumed to be that the thoroughly cleaned glass surface is thoroughly wetted by the rain which runs off uniformly without the formation of drops or streaks.

In practicing the invention, the composition is readily prepared simply by dissolving the pyrophosphate in water and then adding the required proportion of propyl alcohol or the preferred isopropyl alcohol. The proportions of these materials are such as to yield the desired 20% to 30%, more or less, of alcohol and about 0.05% to 0.1% of the tetrasodium or tetra potassium pyrophosphate. The percentage of the pyrophosphate is such as to produce an adequate and sufficiently quick cleaning of scum or film or other objectionable effects appearing upon the windshield, but is to be insufficient to cause re-formation of such film merely by reason of the presence of pyrophosphate which has been left after wiping. A good average percentage which has been employed is 0.08% of tetrasodium pyrophosphate. A good working range is from 0.05% to 0.1%. An over-all range is between about 0.02% and 0.2%. When using tetrasodium pyrophosphate, a pH value of at least 9, preferably at least 9.5, seems to be necessary to accomplish good cleaning, and 0.02% of the pyrophosphate is scarcely adequate for this purpose inasmuch as it yields a pH value of only about 8. When employing from 0.1% to 0.15% the pH value is about 10.2. As 0.15% is closely approached or exceeded, the tendency of this proportion of the pyrophosphate to cause quick re-formation of film or deposit upon the glass simply by reason of the presence of the pyrophosphate is very appreciable. Therefore, for practical purposes the limit appears to be about 0.15%, or possibly a little more, and any percentage above 0.2% is so excessive as to be practically out of the question from the standpoint of film reforming. As has been indicated above when around 0.2% to 0.25% or higher of tetrasodium pyrophosphate is employed, even if the windshield is promptly wiped and then promptly allowed to dry, an objectionable haze or film will have already formed with the result that vision is somewhat obscured, and, what is more important, if rain or fog is encountered thereafter spotting and streaking conditions result when the windshield wiper passes across the glass. This effect is produced because the fog or rain then fails to wet the glass evenly and as a result a continuous water film is not produced. This uneven splotchy effect seriously interferes with driving in many cases and is to be avoided. Therefore for practical purposes the percentage of pyrophosphate employed should not fall appreciably below 0.05% and should not exceed about 0.15%, the pH value running from about 9.5 to 10.2.

As has been previously indicated, the percentage of the propyl alcohol normally runs from 20% to 30% and may, if desired, extend to 50% if rapid drying is important. The latter condition might be desirable for cold weather uses. The preferred isopropyl alcohol could for some uses be replaced with normal propyl alcohol if highly resistant lacquers or the like border the glass so as to resist the tendency of normal propyl alcohol in these proportions to attack many paints and lacquers. These alcohols are preferred to all other alcohols because they have the necessary quick drying and wetting and spreading properties which are not found in other alcohols except those which are too active toward paints and lacquers.

These compositions may be easily applied by spraying or by means of applicators such as a cloth moistened with the solution, and they will then wet, spread and clean readily. The surfaces are easily wiped dry without clouding or streaking when sufficient solution is applied to remove the dirty deposits which have accumulated on the glass.

As has also been indicated, the present type of composition has been found highly satisfactory in rain and fog, inasmuch as it removes from the glass whatever film has deposited and heretofore has not been removed, or it prevents the development of a certain haze or film subsequent to the application, as the case may be. Apparently, solutions of the present invention remove objectionable film or haze which forms on the glass surfaces and heretofore has not been removed. It is possible that an alkaline chemical compound has developed on the glass during exposure to the atmosphere, and that it is this which needs to be removed when cleaning. There are some indications that it is such a substance which is removed by the present cleaner. It is postulated that aluminum and iron compounds in the glass enter into the reaction of the alkaline chemical compounds mentioned as being formed under driving conditions. These aluminum and iron compounds presumably are amphoteric and may be removed either with materials sufficiently acidic or sufficiently alkaline. They are, however, not removable by materials strictly neutral (pH 7) or by materials nearly neutral (e. g. pH 6 or pH 8). At any rate this theory appears to offer an explanation for all observed conditions. However, whatever be the fact or theory, the present composition nevertheless overcomes former difficulties when windshield wipers failed to leave even, transparent surfaces and instead produced extensive smeary or splotchy effects.

Certain modifications of this invention may be employed especially for other purposes than windshield cleaning. Thus where good wetting and spreading combined with quick drying is of no great importance ethyl alcohol may be used instead of the propyl alcohols, or even the still poorer wetting and spreading methyl alcohol. In these cases, however, too much alcohol ordinarily is required to be economically practical. For example, one and one-half to nearly twice as much ethyl or methyl alcohol is required as with isopropyl alcohol. The higher aliphatic alcohols attack lacquer and paint too readily and therefore cannot be used.

Again, for some uses other than windshield cleaning, alcohols may be omitted entirely, as where they are not permitted or are not indicated. In such cases one of the so-called synthetic wetting and spreading agents will be employed, such as the esters of sulfonated bicarboxylic acids described in the Jaeger Patent 2,028,091 and known in the trade as "Aerosol OT, MA, or AY," or the salts of a homologous series of substituted aromatic sulfonic acids known as the "Santomerse" series of the Monsanto Chemical Co., or even some of the common soaps such as sodium oleate where small soap residues are not objectionable. These materials must be stable in the alkaline solutions. These wetting and spreading agents will be used in small proportions such as about 0.1% but insufficient to leave objectionable residues or cause serious aberration as where used on windows.

The range ordinarily will be from about 0.02% to 0.2% or roughly the same content range as that of the pyrophosphate employed. The invention in its broadest aspects also includes these modifications.

In all cases where the compositions are to be used for windshield cleaning or comparable uses, non-drying materials such as glycerine should be omitted on account of the film left thereby and the tendency thereof to gather dust and the like. Where pH values are mentioned, it is understood that they refer to solutions of strengths comparable to those limits here indicated.

It is to be understood that these disclosures are illustrative of the generic invention and are not to be taken as limiting the scope of the claims.

I claim:

1. A glass cleaning composition for the cleaning of automobile windshields comprising a mixture of water, a lower aliphatic alcohol selected from the class consisting of methyl, ethyl and propyl alcohols and a salt selected from the class consisting of tetrasodium pyrophosphate and tetrapotassium pyrophosphate, said alcohol representing approximately 20% to 50% of said composition to impart good wetting properties and drying characteristics, said salt representing approximately 0.02% to 0.2% of said composition and said water representing substantially the remainder of said composition, said composition being free from materials which would present non-drying characteristics or leave film-forming or haze-forming residues.

2. A composition according to claim 1 wherein the alcohol is isopropyl alcohol.

3. A composition according to claim 1 wherein the pyrophosphate is tetrasodium pyrophosphate.

4. A composition according to claim 1 wherein the alcohol is isopropyl alcohol and the pyrophosphate is tetrasodium pyrophosphate present in an amount approximating 0.08%.

5. A composition according to claim 1 wherein the pyrophosphate is present in an amount approximating 0.08%.

MARCELLUS T. FLAXMAN.